United States Patent Office 3,240,818
Patented Mar. 15, 1966

3,240,818
METHOD OF PREPARING TETRAALKOXY-BUTENES
Donald M. Burness, Rochester, N.Y., assignor to Eastman Kodak Company, Rochester, N.Y., a corporation of New Jersey
No Drawing. Filed June 19, 1961, Ser. No. 117,782
9 Claims. (Cl. 260—615)

This invention relates to a method of making tetraalkoxybutenes by reacting upon furan with chlorine or bromine and methyl alcohol at a temperature of approximately 0° C. in the presence of a tertiary amine in an amount no more than will neutralize but a part of the halogen acid formed in the reaction.

Tetramethoxybutenes have been prepared by the addition of chlorine or bromine to furan in methanol at temperatures below −25° C. and neutralizing at a higher temperature subsequently, as described in U.S. Patent No. 2,768,976 of Weidlich and Schulz, granted October 30, 1956. This method, however, has certain disadvantages such as the necessity of unreasonably low reaction temperatures which are difficult to attain in large scale operations.

One object of my invention is to provide a method for preparing tetraalkoxybutenes in good yield at reasonable temperatures. Another object of my invention is to provide a method of reacting upon furan which results in cleavage of the furan ring. A further object of my invention is to provide a method of reacting upon furan with halogen to obtain open chain compounds. A still further object of my invention is to provide a method of preparing an intermediate useful for the preparation of succinaldehyde. Other objects of my invention will appear herein.

I have found that open chain compounds may be prepared from furan at a moderate temperature if when reacting thereon with chlorine or bromine in an alcohol solution a limited amount of a tertiary amine is used. In a procedure in accordance with my invention furan is mixed with a tertiary amine in solution in a $C_1$ to $C_4$ alcohol such as methanol or ethanol and is then subjected to the action of chlorine or bromine at a temperature in the vicinity of 0° C. Without the use of the tertiary amine, side reactions leading to excessive amounts of halogenated by-products occur except at a extremely low temperature such as below −25° C. The amount of tertiary amine employed should neutralize no more than part of the halogen acid formed as a by-product in the reaction. As the tertiary amine triethyl amine, trimethyl amine, or pyridine may be desirably employed in a proportion of approximately $\frac{1}{20}$ to $\frac{3}{4}$ of the amount which completely neutralizes the halogen acid formed in the reaction. As a result of the reaction, good yields of 1,1,4,4-tetraalkoxy-2-butene are obtained at temperatures in the vicinity of 0° C. The temperature is best controlled in the range of 5° to −10° C. The product obtained may also contain a small proportion of 1,1,2,4,4-pentamethoxybutane, which may be removed by fractional distillation if desired.

The preferred procedure for preparing tetraalkoxybutenes in accordance with my invention involves adding bromine or chlorine to a solution of approximately equal molar amounts of furan and tertiary amine base in a solvent comprising a large excess of the desired alcohol held at a temperature of approximately 0° C. The reaction is allowed to proceed to completion whereupon the product may then be worked up after neutralization of the excess acid with an organic or inorganic base.

A large excess of alcohol is employed in the reaction which may or may not also contain an inert co-solvent, such as benzene or chloroform. The halogen may be introduced in solution in the solvent used or it may be added undiluted to the reaction mixture, the latter procedure being usually selected in the use of chlorine. It is ordinarily advantageous with the use of chlorine to provide a catalyst which aids in the cleavage of the furan ring, for instance, about 0.1 equivalent of zinc chloride.

The organic base used may consist of any of a variety of tertiary amines, either aliphatic or aromatic in character. Triethyl amine, trimethyl amine or pyridine are all convenient tertiary amines to serve as the base in the reaction of the invention. In the case of bromine, pyridine has been preferred, while in the case of chlorine the aliphatic amines have been found to be very satisfactory. It is desirable to restrict the amount of base to the range given, because with the use of too large a quantity of base cleavage of the furan ring may not occur. When too small an amount of base is used there, halogen-containing impurities tend to form as a by-product of the reaction. When bromine is employed as the halogen, it is preferable to use a larger quantity of amine than the satisfactory minimum when chlorine is used. The formation of halogen-containing impurities in the reaction mass not only reduces the yield but the presence thereof is liable to poison the catalysts which might be employed in subsequent operations upon the product obtained.

I have found that the reaction is best controlled when the temperature is retained within the range of +5° C. to −10° C. Higher temperatures result in more than a minimum of by-product formation, particularly of organic halogen compounds. The time employed for the reaction may vary considerably, such as from 15 minutes up to 4 hours or even longer measured from the time the addition of materials to the reaction mass has been completed. The time may depend upon various factors within the ranges given, such as the halogen used, the type and amount of base employed, the rate of addition of the halogen, the temperature employed, and the like. The preferred time for use is at the option of the operator of the reaction and the optimum time for given set of conditions may be determined by those skilled in the chemical arts; for instance, by the use of gas chromatography of the reaction or the reaction product after isolation. Typical reaction times are given in the examples supplied herewith. If desired, the process can be operated in a continuous reactor such as of the type described by Allen et al., Journal of Chemical Education, vol. 32, page 394 (1955).

The products obtained by the process in accordance with my invention can vary in composition but generally contain 55 to 75% of 1,1,4,4-tetramethoxy-2-butene, 15 to 40% of 1,1,2,4,4-pentamethoxybutane and minor amounts of other products. The various compounds can be separated by means of fractional distillation although in some cases use of the mixture would be desirable. The following examples illustrate my invention:

EXAMPLE 1

*1,1,4,4-tetramethoxy-2-butene*

160 ml. of furan, 204 g. of triethyl amine, and 10 g. of fused zinc chloride were dissolved in 1800 ml. of methanol which solution was cooled to less than 0° C. and 154 g. of chlorine gas was introduced therein by means of a glass tube over a period of 90 minutes. The mixture was stirred vigorously and held at 0° C. to −5° C. during the 90 minutes that the chlorine gas was added and for 4 hours thereafter. There was then mixed into the mass 400 g. of sodium carbonate and 100 g. of sodium sulfate and it was allowed to stand overnight, during which time a temperature of 25° C. was reached. The mass was filtered, the solvent was removed over anhydrous potassium carbonate reducing the volume to 500–600 ml. and the residue was extracted with benzene. The benzene solution was washed to neutrality with aqueous sodium carbonate. It was then subjected to distillation to give 280–300 g. of a product containing 57–63% of 1,1,4,4-tetramethoxy-2-butene (I) and 28–35% of 1,1,2,4,4-pentamethoxybutane (II). These two products could be separated by fractional distillation into product I, having a boiling point of 75° C. at 6 mm. pressure, and product II, having a boiling point of 105° C. at 16 mm. pressure.

EXAMPLE 2

*1,1,4,4-tetramethoxy-2-butene*

76 ml. of furan and 79 g. of pyridine were dissolved in 500 ml. of methanol and the solution was cooled to 0° C. to −5° C. There was then added thereto an ice cold solution of 52.5 ml. of bromine and 500 ml. of methanol over a period of 40 minutes with agitation. The temperature was held for an additional 2 hours at 0° C. and the mixture was then treated as in the preceding example. The crude product distilled off was shown by gas chromatography to contain 65% of 1,1,4,4-tetramethoxybutene, 16% of pentamethoxybutane, and lesser amounts of by-products including less than 1% of bromo compounds. Under similar conditions but using 158 g. (2 equivalents) of pyridine the only product obtained is 2,5-dimethoxy-2,5-dihydrofuran in 54% yield.

EXAMPLE 3

*1,1,4,4-tetramethoxy-2-butene*

75 ml. of furan and 51 g. (0.5 equivalents) of triethylamine were dissolved in 500 ml. of methanol. To this solution while maintained at +5° C. to −5° C. was added a solution of 52.5 ml. of bromine and 500 ml. of methanol over a period of 45 minutes with stirring. The mass was held at 0° C. for 2 hours and was then worked up as described in Example 1 to give 124 g. of a product distilling at 83–126° C. at 7 mm. pressure. This product consisted of 52% 1,1,4,4-tetramethoxybutene, 27% of pentamethoxybutane and 17% of bromo compounds.

EXAMPLE 4

*1,1,4,4-tetramethoxybutane-1,1,2,4,4-pentamethoxybutane*

This example illustrates the conversion of the product to the saturated form. The crude product from Example 1 was treated with silver oxide to remove any traces of amine hydrochloride and was redistilled. A 137 g. portion of the distillate was dissolved in an equal volume of benzene and was hydrogenated using Raney catalyst at 40–50° C. and 1,000 p.s.i. pressure. Distillation of the product gave 107 g. of colorless liquid, boiling at 51–110° C. at 18 mm. pressure. This product contained 63% of tetramethoxy- and 24% of pentamethoxy-butane.

Instead of methanol one of the other alcohols of 1–4 carbon atoms, such as ethanol, propanol or butanol, may be employed resulting in the corresponding alkoxy compounds.

I claim:

1. A method of preparing tetraalkoxybutenes which comprises reacting a lower aliphatic alcohol solution of furan containing tertiary amine in an amount approximately 1/20 to 3/4 of that equivalent to the halogen acid which forms in the reaction with a halogen selected from the group consisting of chlorine and bromine at a temperature within the range of 5° C. to −10° C.

2. A method of preparing tetraalkoxybutenes which comprises reacting a methanol solution of furan containing tertiary amine in an amount approximately 1/20 to 3/4 of that equivalent to the halogen acid which forms in the reaction with a halogen selected from the group consisting of chlorine and bromine at a temperature within the range of 5° C. to −10° C.

3. A method of preparing tetraalkoxybutenes which comprises reacting a lower aliphatic alcohol solution of furan containing tertiary amine in an amount approximately 1/20 to 3/4 of that equivalent to the halogen acid which forms in the reaction with chlorine at a temperature within the range of 5° C. to −10° C.

4. A method of preparing tetraalkoxybutenes which comprises reacting a methanol solution of furan containing tertiary amine in an amount approximately 1/20 to 3/4 of that equivalent to the halogen acid which forms in the reaction with chlorine at a temperature within the range of 5° C. to −10° C.

5. A method of preparing tetraalkoxybutenes which comprises reacting a lower aliphatic alcohol solution of furan containing tertiary amine in an amount approximately 1/20 to 3/4 of that equivalent to the halogen acid which forms in the reaction with a halogen selected from the group consisting of chlorine and bromine at a temperature of approximately 0° C.

6. A method of preparing tetraalkoxybutenes which comprises reacting a lower aliphatic alcohol solution of furan containing tertiary amine in an amount approximately 1/20 to 3/4 of that equivalent to the halogen acid which forms in the reaction with bromine at a temperature within the range of 5° C. to −10° C.

7. A method of preparing tetraalkoxybutenes which comprises reacting a methanol solution of furan containing triethyl amine in an amount approximately 1/20 to 3/4 of that equivalent to the halogen acid which forms in the reaction with chlorine gas at a temperature of approximately 0° C.

8. A method of preparing tetraalkoxybutenes which comprises reacting a methanol solution of furan containing pyridine in an amount approximately 1/20 to 3/4 of that equivalent to the halogen acid which forms in the reaction with bromine at a temperature of approximately 0° C.

9. A method of preparing tetraalkoxybutenes which comprises reacting a methanol solution of furan containing triethyl amine in an amount approximately 1/20 to 3/4 of that equivalent to the halogen acid which forms in the reaction with bromine at a temperature of approximately 0° C.

References Cited by the Examiner

UNITED STATES PATENTS 2,768,976  10/1956  Weidlich et al. _____ 260—615

LEON ZITVER, *Primary Examiner.*

CHARLES B. PARKER, *Examiner.*